United States Patent [19]

Waszmer

[11] 4,205,449
[45] Jun. 3, 1980

[54] MICROCALIPERS WITH CALCULATOR-ASSISTED DISPLAY

[76] Inventor: Jacob Waszmer, 15 E. Bedell St., Freeport, N.Y. 11552

[21] Appl. No.: 760,030

[22] Filed: Jan. 17, 1977

[51] Int. Cl.$^2$ ............................................. G01B 5/00
[52] U.S. Cl. ............................................. 33/147 N
[58] Field of Search ............ 33/125 R, 147 T, 143 L, 33/166, 147 R, 1 V, 147 N, 125 C, 125 A; 235/560–563, 92 DN, 92 EV, 705

[56] References Cited

U.S. PATENT DOCUMENTS

| | | | |
|---|---|---|---|
| 2,995,738 | 8/1961 | Masek | 33/164 R X |
| 3,213,543 | 10/1965 | Masuda | 33/147 T |
| 3,955,073 | 5/1976 | Carew et al. | 33/1 V |
| 3,965,340 | 6/1976 | Renner | 235/92 CP |
| 4,022,014 | 5/1977 | Lowdenslager | 364/705 |
| 4,053,755 | 10/1977 | Sherrill | 235/92 DN |

FOREIGN PATENT DOCUMENTS 338971 7/1959 Switzerland ........................... 33/172 E

*Primary Examiner*—Harry N. Haroian
*Attorney, Agent, or Firm*—Posnack, Roberts, Cohen & Spiecens

[57] ABSTRACT

An improvement in micro-calipers including a main beam, a mount slidably mounted on the main beam, a dial gage carried by the mount, a rack bar mounted on the main beam which has a toothed marginal portion, a pinion mounted on the dial gage which engages with the rack bar, a disc mounted on the gage which has a plurality of electrically conducting and concentrically disposed projections, an electrically conducting pointer coupled to the pinion and rotatable over the projections, a first lead in sliding electrical contact with the pointer, and a second lead in electrical contact with the projections. The leads are attached to first and second contacts of a calculator result-key or the like, so that a predetermined longitudinal displacement of the mount with respect to the main beam from a first position to a second position results in a predetermined number of interruptions in conductivity between the leads.

4 Claims, 5 Drawing Figures

U.S. Patent  Jun. 3, 1980  4,205,449

MICROCALIPERS WITH CALCULATOR-ASSISTED DISPLAY

BACKGROUND OF THE INVENTION

1. Field of the Invention

The present invention relates to micro-calipers with a calculator-assisted display.

2. Description of the Prior Art

Several micro-calipers with a dial gage are known; for example, there are known micro-calipers or snap-type gages utilizing an electrical indication, and embodying visual signal alarms, beam calipers having a dial indicator with a protected contact point, micro-calipers having a dial gage and using a dust-protection cover, a high precision caliper-gage adapted to the transfer of measurement by comparison from one object to another in high degrees of dimensional difference-detectability with the use of optics and/or a sensing element with a degree of amplification, calipers for measuring holes of an extremely small inside diameter, sliding calipers provided with a dial gage, and a device for preventing error in slide calipers.

SUMMARY OF THE INVENTION

All of the aforesaid devices are relatively complex in construction; it is accordingly an object of my present invention to provide micro-calipers which are easily procurable and which yield an easily readable display by simple attachment to a standard hand-held calculator with a display portion.

I accordingly provide an improvement in micro-calipers which includes a main beam, a mount slidably mounted on the main beam, a dial gage carried by the mount, a rack bar fixedly mounted on the main beam having a toothed marginal portion, a pinion mounted on the dial gage and engageable with the rack bar, a disc mountable on the gage and having a plurality of electrically conducting, and concentrically disposed projections, an electrically conducting pointer coupled to the pinion and rotatable over the projections, a first lead in sliding electrical contact with the pointer, and a second lead in electrical contact with the projections, conductivity being established between the leads upon the pointer being in electrical contact with one of the projections; the leads are attached to first and second contacts of a calculator result-key or the like so that a predetermined longitudinal displacement of the mount with respect to the main beam from a first position to a second position results in a predetermined number of interruptions in conductivity between the leads.

The main beam is preferably formed with longitudinal groove, the projections are preferably equispaced from one another, the rack bar is fixedly mounted on the main-beam longitudinal-groove, and the tool preferably includes a longitudinal bar attached to the mount, slidable therewith and having a marginal position of decreased thickness disposed over the rack-bar toothed marginal-portion for covering the teeth thereof.

The distance from one of the projections to an adjoining projection corresponds to a predetermined displacement length of the mount with respect to the main beam; the predetermined length may either be calibratable in inches or centimeters.

The micro-calipers preferably include a calculator, which has a result key, and a display device for displaying a number entered into the calculator; the result key is adapted for selectable addition and subtraction of the entered number.

I also provide a kit for adapting micro-calipers which have a main beam, a mount slidably mounted on the main beam, a dial gage carried by the mount, a rack bar fixedly mounted on the main beam which has a toothed marginal portion, a pinion mounted on the dial gage and engageable with the rack bar which includes a disc mountable on the gage and having a plurality of electrically conducting and concentrically disposed projections, an electrically conducting pointer rotatable over the projections and coupled to the pinion, a first lead in sliding electrical contact with the pointer, and a second lead in electrical contact with the projections, conductivity being established between the leads upon the pointer being in electrical contact with one of the projections. The leads are attachable to first and second contacts of a calculator result-key or the like, and a predetermined longitudinal displacement of the mount with respect to the main beam from a first position to a second position results in a predetermined number of interruptions in conductivity between the leads.

BRIEF DESCRIPTION OF THE DRAWING

My invention will be better understood with reference to the accompanying drawing in which.

DESCRIPTION OF THE PREFERRED EMBODIMENT

Figure 1:
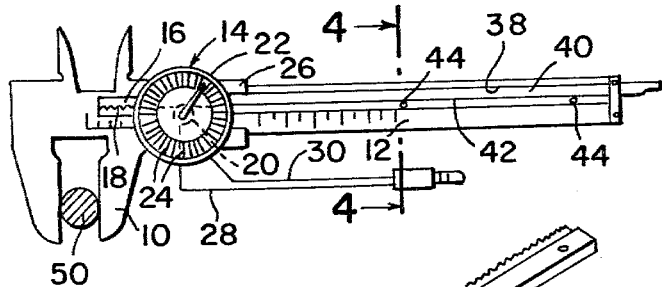
FIG. 1 is an elevational view of the micro-calipers, according to my invention.
Figure 2:
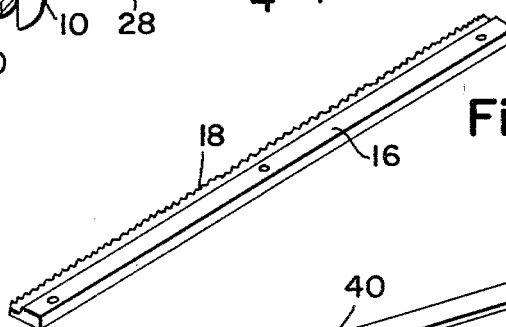
FIG. 2 is a perspective view of a rack fitted to the main beam.
Figure 3:
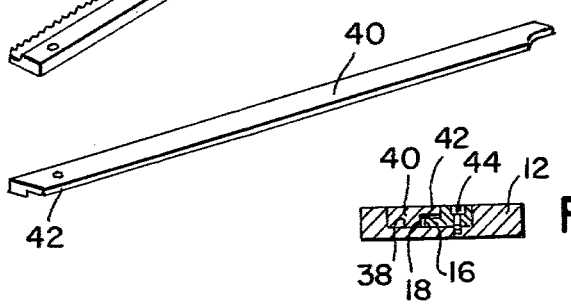
FIG. 3 is a perspective view of a longitudinal bar attached to the mount.
Figure 4:
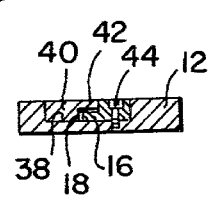
FIG. 4 is an enlarged section of FIG. 1 taken along lines 4—4 in FIG. 1.
Figure 5:
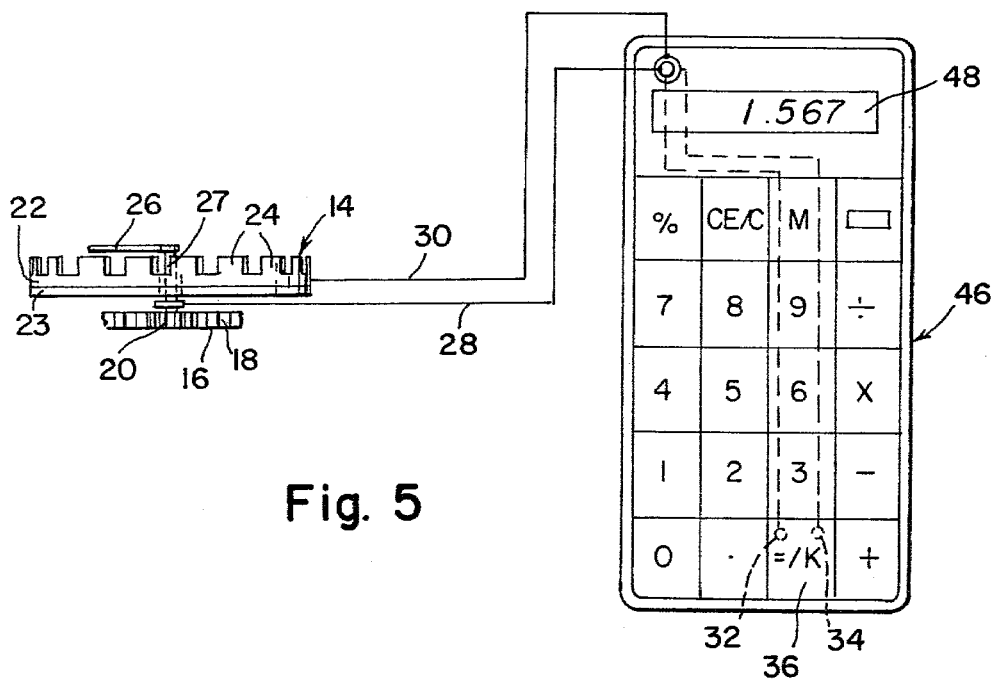
FIG. 5 is an elevational view of the disc mountable on the gage and showing its connection to the result-key of a calculator.

Referring now to the drawing, a sliding mount 10 moves along a main beam 12, and a dial gage 14 is mounted or carried on the mount. A rack bar 16 is fixedly mounted on main beam 12 and is provided with a toothed marginal portion 18. A pinion 20 is mounted on the dial gage 14, and engages with the rack bar 16; additionally, a conducting disc 22 is mounted on the gage 14, being insulated from the gage 14 by a disc 23 of insulating material; the disc 22 is provided with a plurality of electrically conducting and concentrically disposed projections 24. An electrically conducting pointer 26 is coupled to the pinion 20, the pointer 26 and the pinion 20 being electrically insulated from the disc 23. The pointer 26 rotates over the projections 24 when the mount 10 is moved in either a forward or reverse direction. A lead 28 is in sliding contact with the pointer 26, being urged, for example, against a shaft 27 of the pointer 26 by a non-illustrated spring, and a lead 30 is in electrical contact with the projections 24. Conductivity is established between the leads 28 and 30 upon the pointer 26 being electrical contact with one of the projections 24; the leads 28 and 30 may be attached to contacts 32 and 34, respectively, of a calculator result-key 36 or the like, so that a predetermined longitudinal displacement of the mount 10 with respect to the main beam 12 from a first position to a second position results in a number of interruptions in conductivity between the leads 28 and 30. Each depression of the calculator result-key 36 results in an advancement or stepping of the display; for example, the display may consecutively read 1, 2, 3, etc., upon successive depressions of the result-key 36. A typical calculator instrumented as illustrated is, for example, the A.P.F. Mark 27 Computer.

The main beam 12 is formed with a longitudinal groove 38 and the projections 24 are substantially equi-spaced from one another; the rack bar 16 is fixedly mounted on the longitudinal-groove 38 of the main beam 12, by means, for example, of screws 44, and a longitudinal bar 40 is attached to the mount 10 and is slidable therewith, as well as having a marginal portion of decreased thickness 42 disposed over the rack bar toothed marginal-portion 18 for covering the teeth thereof.

The distance from one of the projections 24 to an adjoining projection 24 corresponds to a predetermined displacement length of the mount 10 with respect to the main beam 12; the predetermined length may be calibrated in either inches or centimeters.

The system preferably includes a calculator 46, the latter including the result-key 36 and a display device 48 for displaying the number entered into the calculator 46; the result-key 36 is adapted for selectable addition and subtraction of the entered number. An example of programming the micro-calipers, according to my invention, will now be given. After setting the sliding mount 10 so as to contact the main beam 12, i.e., setting the opening between mount 10 and the main beam 12 to zero, the calculator 46 is typically programmed in the following fashion: the number 0.001 is entered into the calculator by depressing the "decimal point key," followed by two depressions of the "zero" key, followed by depression of the "+" key, followed by another entry of the number 0.001 as above, and then followed by depression of the result-key 36. The display portion 48 of the calculator 46 will then indicate the numeral 0.002. Since the calipers must be zeroed out, it is then necessary to depress the "0" key, when the display portion 48 will indicate 0. Next, the micro-calipers are opened to a desired dimension, for example, to accommodate a cylinder 50. Assume, for example, that the tool has been opened out to a dimension of 0.375 inches, which dimension is larger than the diameter of the cylinder 50. Now the slidable mount 10, which has previously been opened to the dimension of 0.375 inches, must now be moved in a reverse direction until the cylinder 50 is contacted. Before starting the reverse movement of the mount 10, the calculator 46 must, however, be programmed to count in reverse. This is done by first pressing the memory "M" key, followed by depression of the "−" key, followed by another entry of the numeral 0.001, followed by depression of the result-key 36. If the latter sequence is operated correctly, a numeral 0.002 will be seen on the display portion 48. This is followed by another depression of the memory "M" key, and by depression of the result-key 36. If the last sequence has been operated correctly, the number 0.375 will again be seen on the display portion 48. As the mount 10 is now moved in reverse, the calculator 46 will automatically count down and the sequence 0.374, 0.373, etc., will consecutively appear on the display portion 48, until the mount 10 contacts the object inserted between the micro-calipers, for example, the cylindrical object 50. If the diameter of the cylinder 50 is, for example, 0.370 inches, then upon the mount 10 contacting the cylinder 50, the number 0.370 will be shown on the display portion 48, which corresponds to the diameter of the cylinder 50.

So that existing micro-calipers of the type having a main beam 12, a mount 10, slidably mounted on the main beam 12, a dial gage 14 carried by the mount 10, a rack bar 16 fixedly mounted on the main beam 12 and having a toothed marginal portion 18, a pinion 20 mounted on the dial gage 14 and engageable with the rack bar 16, may be easily modified to permit reading out of the dimension of an object inserted between the main beam and the mount of the calipers, I provide a modification kit which includes disc 22 mountable on the gage 14 and having a plurality of electrically conductive and concentrically disposed projections 24, an electrically conductive pointer 26 rotatable over the projections 24 and couplable to the pinion 20, first lead 28 in sliding electrical contact with the pointer 26, and second lead 30 in electrical contact with the projections 24; conductivity between the leads 28 and 30 is established upon the pointer 26 being in electrical contact with one of the projections 24. The leads 28 and 30 may be attached to contacts 32 and 34, respectively, of a calculator result-key 36 or the like, so that a predetermined longitudinal displacement of the mount 10 with respect to the main beam 12 from a first position to a second position results in a predetermined number of interruptions in conductivity between the leads 28 and 30.

The foregoing is considered as illustrative only of the principles of the present invention; since numerous modifications and changes will readily occur to those skilled in the art, it is not intended to limit the invention to the exact construction and operation shown and described, the appended claims encompassing any suitable modifications and equivalents of the present invention. Accordingly, without further analysis,

What is claimed is:

1. An improvement in micro-calipers comprising:
a main beam;
a mount slidably mounted on said main beam;
gage means carried by said mount;
a rack bar fixedly mounted on the main beam and having a toothed marginal portion;
said gage means comprising:
a pinion rotatably mounted on said mount and engaged with said rack bar;
a first disc mounted coaxially with said pinion on said mount and having a plurality of electrically conducting, and concentrically disposed circumferentially spaced projections; the spacing between said projections corresponding to a predetermined displacement length of said mount with respect to said main beam;
an electrically conducting pointer disposed in a plane above said projections for contact therewith;
an insulating disc supporting said first disc on said mount,
a shaft extending coaxially through said discs, said shaft being electrically conductive and connected to said pointer and said pinion in coupled driving relation such that the pointer undergoes rotation about the center of said projections in said plane on said projections;
a first lead in sliding electrical contact with said shaft; and
a second lead in electrical contact with said projections; conductivity being established between said leads upon said pointer being in electrical contact with one of said projections, said first and second leads being attachable to first and second contacts, respectively, of a calculator result-key such that a predetermined longitudinal displacement of said mount with respect to said main beam from a first position to a second position results in rotation of said pointer above said projections and production of a predetermined number of conductivity pulses between said leads, said calculator cumulating said pulses and including a display means for providing visual read out of the cumulated pulses and means for adding and subtracting pulses according to the direction of movement of the mount on the main beam.

2. The micro-caliper improvement according to claim 1, wherein said main beam is provided with a longitudinal groove, said projections are substantially equispaced from one another, said rack bar is fixedly mounted within the said longitudinal groove in the main beam, and further comprising a longitudinal bar attached to said mount, slidable therewith and having a marginal portion of decreased thickness disposed over the rack-bar for covering the teeth thereof.

3. The micro-caliper improvement according to claim 1 wherein said predetermined length is calibratable in inches.

4. The micro-caliper improvement according to claim 1 wherein said predetermined length is calibratable in centimeters.

* * * * *